P. SANDENO.
NON-SPILLABLE MILK PAIL.
APPLICATION FILED AUG. 17, 1914.
1,183,679.
Patented May 16, 1916.
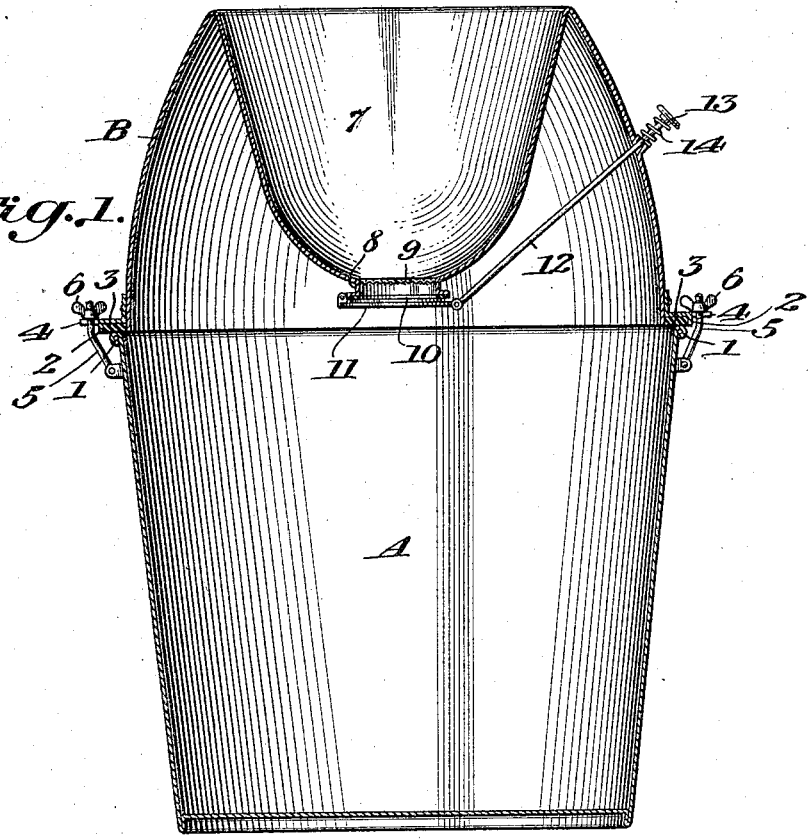
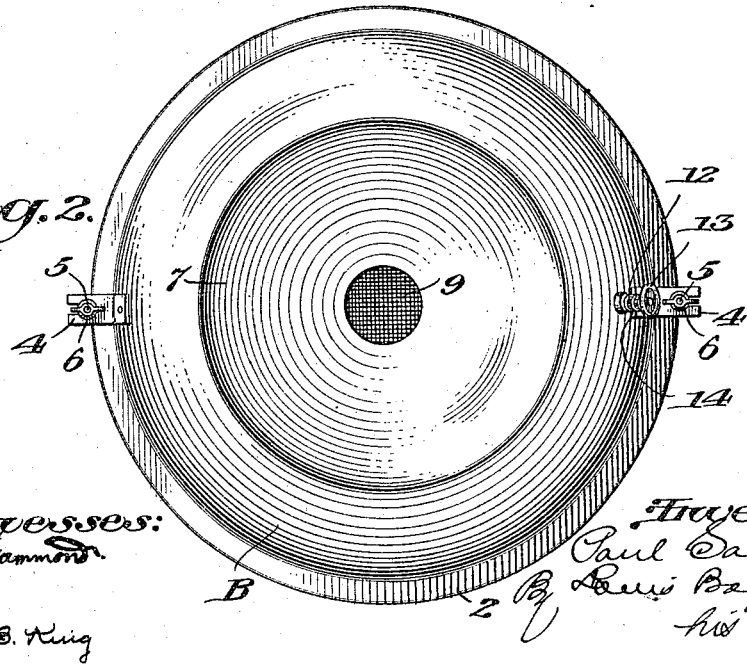

UNITED STATES PATENT OFFICE.

PAUL SANDENO, OF SEATTLE, WASHINGTON.

NON-SPILLABLE MILK-PAIL.

1,183,679.  Specification of Letters Patent.  Patented May 16, 1916.

Application filed August 17, 1914. Serial No. 857,156.

*To all whom it may concern:*

Be it known that I, PAUL SANDENO, a subject of the King of Norway, residing at Seattle, in county of King and State of Washington, have invented certain new and useful Improvements in Non-Spillable Milk-Pails, of which the following is a specification.

This invention relates to an improvement in non-spillable milk pails, and the object is to provide a cover having a receptacle formed therein, which receptacle is provided with outlet openings, and means for closing the outlet opening after the pail or can has been filled.

The invention relates to still other novel features of construction and combinations of parts which will be hereinafter more fully described and pointed out in the claim.

In the accompanying drawings: Figure 1 is a vertical sectional view through the can; and Fig. 2 is a top plan view.

A represents the can or pail, and B is the cover. The upper edge of the pail or can is provided with a beading 1, and an annular flange 2 is formed along the lower edge and on the exterior wall of the cover B. Received within the flange is a rubber gasket 3, against which the beading 1 is received. Forked straps 4, 4 are connected to the exterior wall of the cover B, and hinged bolts 5 are connected to the wall of the pail or can A. These bolts are adapted to be swung into the forked ends of the straps 4 and are connected to the straps by means of the thumb nuts 6, which are screwed upon the bolts for drawing the cover and can together and producing a tight joint.

The cover B is provided with a recess in the upper surface thereof, producing an inlet chamber 7. An annular flange 8 is formed on the bottom of the chamber 7, producing an inlet to the can or pail A.

A fine mesh screen 9 is supported within the annular flange for straining the milk or liquid as it is discharged into the can. A rubber washer 10 is connected to the flange, and a lid 11 is hinged to one end of the flange. Pivotally connected to the cover is a rod 12 having a knob 13 for actuating the rod for the purpose of moving the lid to an open or closed position. A coil spring 14 is interposed between the knob 13 and the walls of the cover B for normally maintaining the lid 11 in a closed position.

When the lid 11 is closed, the can can be rolled on its side and inverted without any danger of the milk issuing therefrom. When, however, it is desired to remove the milk from the can, the cover B is removed therefrom.

From the foregoing it will be seen that a very simple arrangement has been provided consisting of few parts and a cover made of a single piece of material providing a recess 7 and an annular flange 8; in the flange 8 the strainer is mounted, and connected to the lower edge thereof is a hinged lid 11 for forming a closure therefor.

I claim:

A milk pail comprising a cylindrical lower part and a domed upper part, means for detachably securing the parts together, a bowl shaped depression formed in said upper part having a valve closed outlet at its bottom, a rod held yieldingly extended through the side of the upper part and arranged to be depressed by the operator to open said valve closed outlet.

In testimony whereof I affix my signature, in the presence of two witnesses.

PAUL SANDENO.

Witnesses:
 S. BJORNSON,
 ANNA SIKKAU.

Copies of this patent may be obtained for five cents each, by addressing the "Commissioner of Patents, Washington, D. C."